United States Patent [19]

Kell

[11] Patent Number: 4,805,388
[45] Date of Patent: Feb. 21, 1989

[54] CROP GATHERING HEAD AND BELT, SPROCKET AND SHEAVE THEREFOR

[75] Inventor: Ralph W. Kell, Lincoln, Nebr.

[73] Assignee: The Goodyear Tire & Rubber Company, Akron, Ohio

[21] Appl. No.: 642,696

[22] Filed: Aug. 20, 1984

Related U.S. Application Data

[63] Continuation of Ser. No. 382,268, May 26, 1982, abandoned.

[51] Int. Cl.$^4$ ............................................. A01D 45/02
[52] U.S. Cl. .......................................... 56/98; 474/164
[58] Field of Search ................... 56/98, 119, 53; 198/494; 474/92, 152, 149, 901, 162, 164, 153

[56] References Cited

U.S. PATENT DOCUMENTS

| | | | |
|---|---|---|---|
| 104,119 | 6/1870 | Cowles | 474/164 |
| 1,549,594 | 8/1925 | Menningan | 474/164 |
| 2,571,811 | 10/1951 | Andrews | 56/119 |
| 2,791,911 | 5/1957 | Wasko | 474/164 |
| 3,279,272 | 10/1966 | Gudmundsen | 474/164 |
| 3,807,247 | 4/1974 | Shiina | 474/152 |
| 3,854,272 | 12/1974 | Lane, III et al. | 56/119 |
| 3,868,863 | 3/1975 | Gasner | 474/152 |
| 4,072,062 | 2/1978 | Morling et al. | 474/153 |

Primary Examiner—Paul J. Hirsch
Attorney, Agent, or Firm—Marc R. Dion, Sr.

[57] ABSTRACT

A crop gathering head 10 including crop gathering belt 11, 12 of reinforced elastomeric material and its associated driving sprocket 30 and idler sheave 50 is described. The belt 11 or 12, sprocket 30 and sheave 50 system may be used to convey crops into a combine. The belt 11 or 12 includes a plurality of cleats 20 of elastomeric material on its top surface 18 and a plurality of equally spaced driving lugs 24 of elastomeric material on its bottom surface 19. The sprocket 30 has first and second sides 31, 32 respectively and comprises a plurality of equally spaced apart radially projecting teeth 33 separated by first and second cavities 34, 34' respectively. The first cavities 34 are open only to the first side 31 of the sprocket 30. The second cavities 34' are open only to the second side 32 of the sprocket 30. The depth D of each cavity exceeds the height H of each driving lug 24 of the belt 11 or 12 and the cavities 34, 34' are shaped such that foreign material, for example, corn kernels, mud and ice do not clog the driving sprockets 30 and belts 11 or 12 and disable the system. Each belt 11 or 12 is also entrained about an idler sheave 50 that includes a cylindrical hub 51 having a pair of axially spaced radially projecting flanges 52, 53 respectively thereon. The inner side surfaces 54 of the flanges 52, 53 converge in a direction toward the axis of rotation 55 of the sheave 50. Each flange 52 or 53 is interrupted in the circumferential direction of the sheave 50 to provide a self-cleaning effect upon engagement with its associated belt 11 or 12.

5 Claims, 4 Drawing Sheets

CROP GATHERING HEAD AND BELT, SPROCKET AND SHEAVE THEREFOR

This is a continuation of application Ser. No. 382,268, filed on May 26, 1982, now abandoned.

The abstract is not be taken as limiting the invention of this application and in order to understand the full nature and extent of the technical disclosure of this application reference must be made to the accompanying drawing and to the following detailed description.

This invention relates to a crop gathering head and more particularly to a belt, sprocket and sheave system for use in a crop gathering machine.

There are various configurations of machines to be used in harvesting of crops such as corn in which the stalk of the crop is drawn into the forward end of the gathering portion of the harvester by means of metallic chains including time or fingers attached thereto. The stalk of the corn enters a narrow slot which is elongated in the fore and aft direction of the machine, i.e parallel to the direction in which the machine moves. The slot is of sufficient width to accept the stalk but not permit the ears of corn to fall through. A mechanism mounted below the planar faces forming the slot draws the stalk downwardly through the slot thereby separating the ears from the stalk. After separation, the ears are conveyed by means of a pair of opposed chains to the rear of the gathering head for further processing; e.g. removal of the husk and separation of the corn kernels from the ear in known manner.

Prior art gathering mechanisms which employ metallic chain and sprockets, although they have been used with considerable success, generate a considerable amount of noise and vibration and of course are subject to rusting and loss of tension as they wear at their links. Additionally such metallic chains are likely to damage the remainder of the harvesting machine should the chain or a portion of it pass through the mechanism. Also, use of metallic gathering chains at ground speeds of the harvester in excess of about four (4) miles per hour results in very rapid wear of the chains. To extend their service life, metallic chains require periodic lubrication.

The features and advantages of the invention will be better understood from consideration of the following detailed description taken in conjunction with the accompanying drawings in which primes (e.g. 1 versus 1') are used to distinguish between various embodiments:

Figure 1:
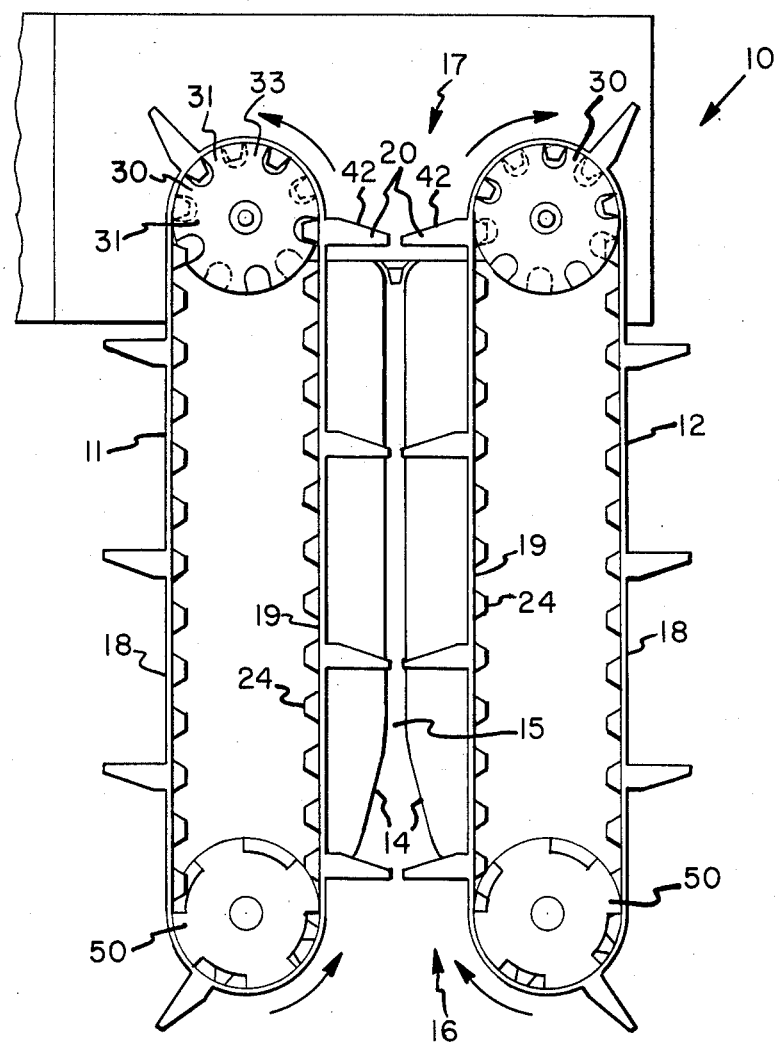
FIG. 1 is a top plan view of a crop gathering head embodying the invention.

Referring to FIG. 1 there is shown a crop bathering head 10 that includes a pair of synchronously driven belts 11, 12. Belts 11,12 run parallel to one another in a common plane located above the metal flanges 14 which form the slot 15 of the crop gathering head 10. The direction of travel belt 11 is counterclockwise and while the direction of travel of belt 12 is clockwise thus the belts 11 and 12 work in concert to transport ears of corn (not illustrated) from the forward end 16 to the aft end 17 of the crop gathering head 10 after the ears have been snapped off by withdrawing the stalk downwardly through the slot 15 between flanges 14. Belts 11 and 12 as well as their driving systems are identical except for their arrangement on the machine; one being the mirror image of the other.

Figure 2:
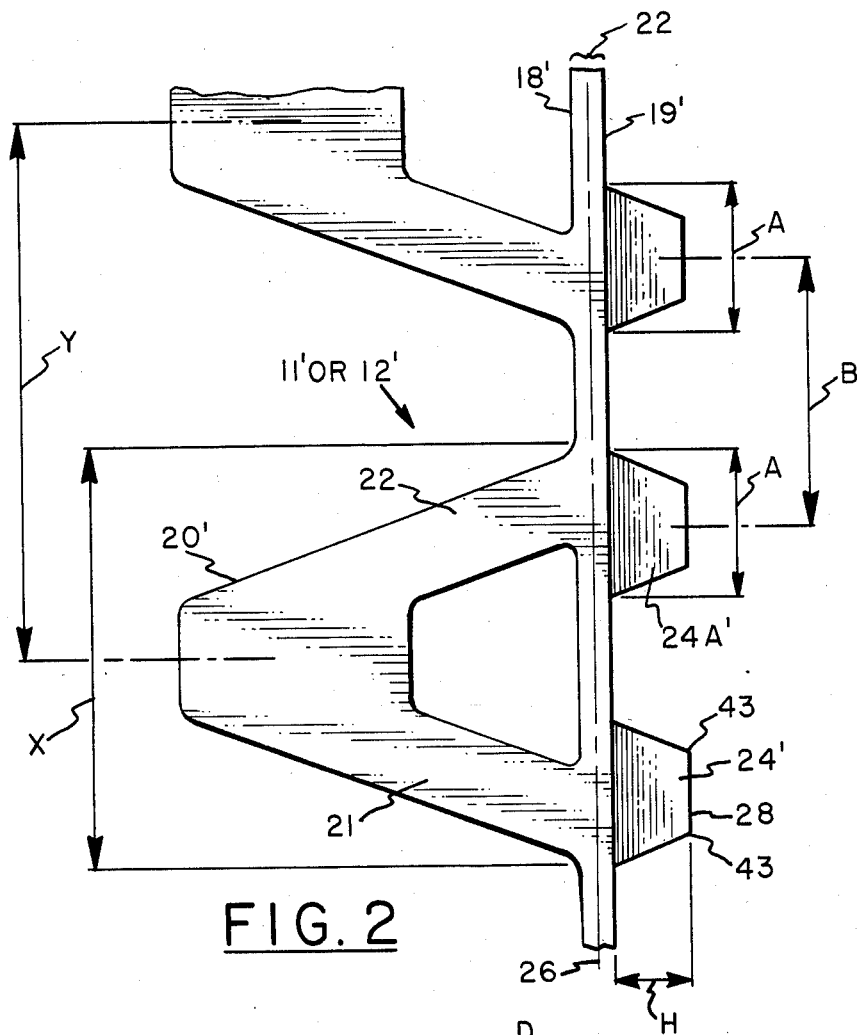
FIG. 2 is an enlarged longitudinal section of a portion of a preferred embodiment of a belt according to the invention.

Referring now to FIG. 2 in addition to FIG. 1, each belt 11, 12, 11', 12' includes a top surface 18, 18' and a bottom surface 19, 19'. The top surface 18, 18' is the surface of the belt 11, 12, 11', 12' that is directed away from the drive sprocket 30 and idler sheave 50. The bottom surface 19, 19' is that surface of the belt 11, 12, 11', 12' nearest to the drive sprocket 30 and sheave 50. The top surfaces 18, 18' of belts 11, 11' and 12, 12' are adjacent to and opposed to one another over the crop gathering glanges 14. The top surface 18, 18' of each gathering belt 11, 12 11', 12' includes a plurality of identical cleats 20, 20' of elastomeric material. Each cleat 20, 20' projects substantially perpendicularly from the top surface 18, 18' of its respective belt. In a preferred embodiment each cleat 20' when viewed in longitudinal section of the belt 11', 12' (as shown in FIG. 2) is of triangular configuration with the base of the triangle being joined to the top surface 18' of the belt. Each cleat 20' hen viewed in longitudinal section of the belt 11' or 12' has a longitudinal dimension X at its base. The cleats 20' are uniformly spaced apart from one another by their pitch Y. The term pitch as employed herein means the distance between succeeding lugs or cleats as measured from a given point on one cleat to the identical point on the next cleat or lug. In the particularly preferred embodiment shown each cleat 20' when viewed in longitudinal section of the belt 11', 12' is a hollow triangle one leg 21 of the triangle extends from the base of the clear 20' from a point opposite the location of a driving lug 24', the other leg 22 of the triangular configured cleat 20' extends from a point opposite the next driving lug 24A'.

The cleats 20, 20' possess sufficient stiffness so as to positively convey the ears of corn from the forward end 16 to the aft end 17 of the gathering head 10. The hollow triangular configuration 20' shown accomplishes this with a minimum amount of elastomeric material. It is understood that other cleat configuration will work, however. Due to the inherent resilience and flexibility of the elastomeric material of which the cleats are formed, should the harvesting machine become jammed the cleats 20, 20' will then deflect without being damaged or causing damage to other parts of the crop gathering head 10.

A plurality of driving lugs 24, 24' of elastomeric material project from the bottom surface 19, 19' of the belt 11, 12, 11', 12'. Each driving lug 24, 24' projects generally perpendicularly relative to the bottom surface 19, 19' of the belt 11, 12, 11' or 12'. Each driving lug 24 when viewed in a longitudinal section of the belt 11, 12, 11' or 12' is of trapezoidal configuration with the base of the trapezoid joined to the bottom surface 19, 19' of the belt 11, 12, 11' or 12'. Each lug 24, 24' has a longitudinal dimension at its base of A. Succeeding lugs 24, 24' are spaced apart from one another in the longitudinal direction of the belt 11, 12, 11' or 12' by lug pitch B.

Figure 3:
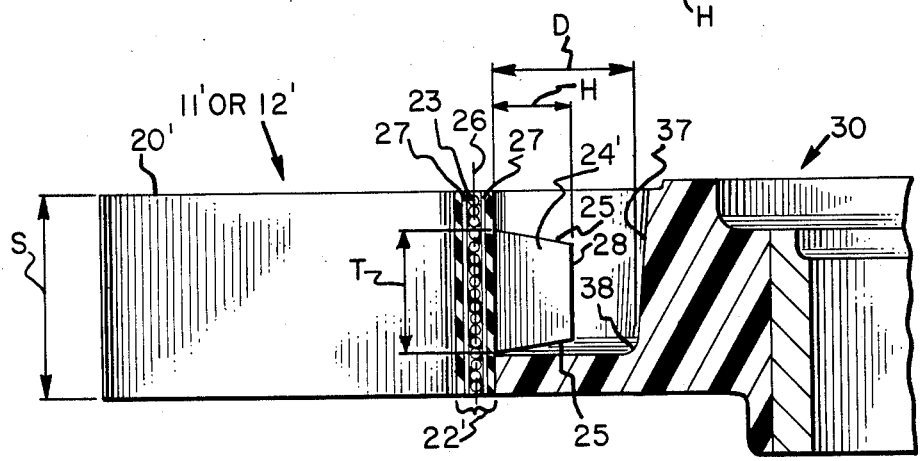
FIG. 3 is an enlarged sectional view illustrating, a drive sprocket according to the invention with the belt of the invention engaged therewith being shown in transverse section.

Referring now to FIG. 3 it is seen that each of the driving lugs 24' when viewed in a transverse section of the belt 11' or 12' is of trapezoidal configuration with the base of the trapezoid joined to the bottom surface 19' of the belt. The base of each cleat 24' as a transverse dimension T which is less than the transverse dimension S of the belt 11' or 12'. The sides 25' of each drive lug 24' converge in a direction away from the bottom surface 19' of the belt 11' or 12'.

Each belt 11, 12, 11' or 12' is of reinforced elastomeric material and includes a flexible reinforced structure 22, 22' having a top surface 18, 18' and a bottom surface 19, 19' located intermediate the crop gathering cleats 20, 20' and the driving lugs 24, 24'. The structure 22, 22' has one or mroe longitudinally extending high elastic modulus cords 23 embedded therein; the longitudinally extending center plane of the cords defining the pitch line of the belt. A layer 27 of lightweight woven or knitted fabric may be positoned adjacent the top surface 18, 18' and bottom surface 19, 19' of the belt structure 22, 22' to provide increased durability of the belt 11, 12, 11' or 12'.

Figure 4:
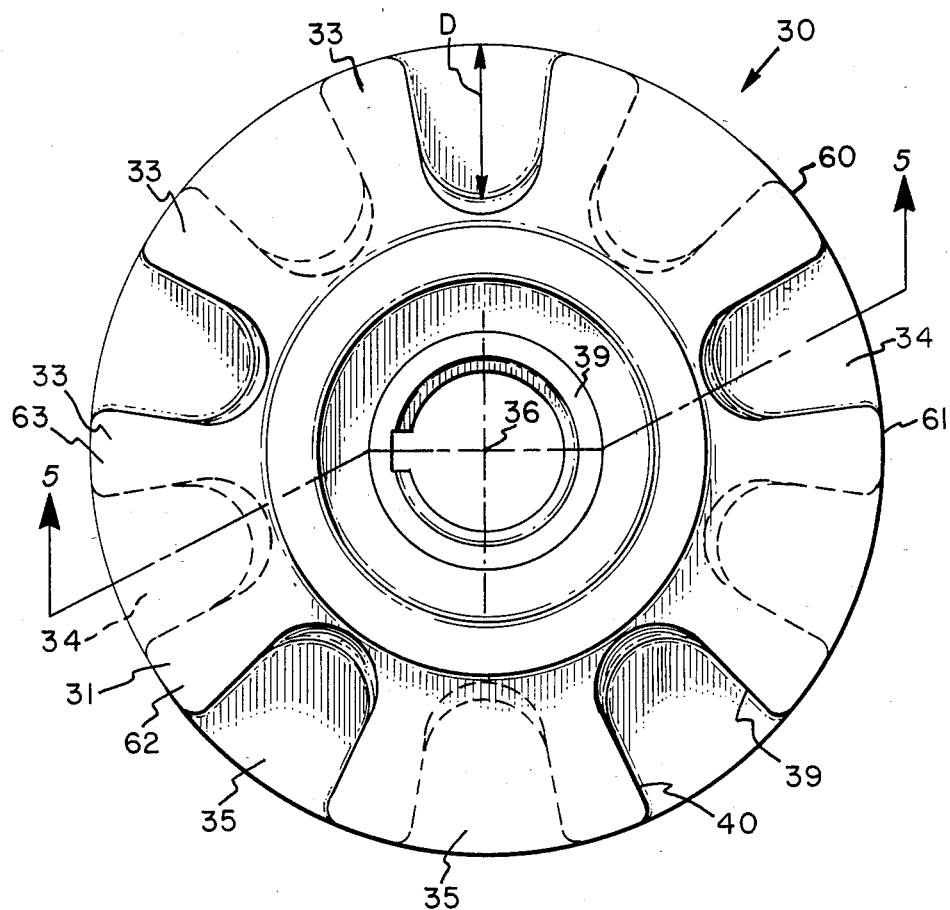
FIG. 4 is a side view of a drive sprocket according to the invention.
Figure 5:
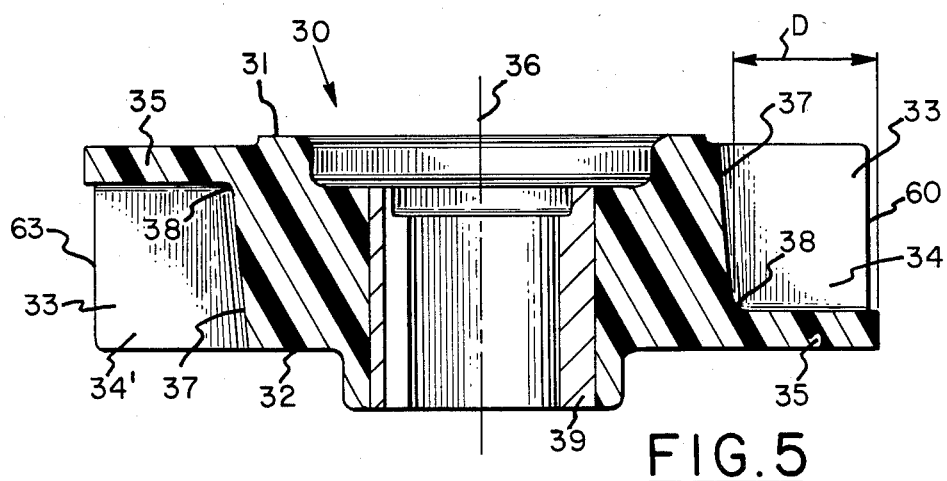
FIG. 5 is a sectional view of a drive sprocket according to the invention, the section being taken along line 5—5 of FIG. 4.

Referring now to FIGS. 1, 3, 4 and 5 therein is shown a drive sprocket 30 according to the invention, both individually and in conjunction with the belt 11, 12, 11' or 12' of the invention and the gathering head 10 of the invention. Each driving sprocket 30 has a first side 31 and a second side 32 as shown in FIG. 5 and includes a plurality of equally spaced apart radially projecting teeth 33 (best seen in FIGS. 1 and 4) for engagement with the driving lugs 24, 24' of the belt 11, 12, 11' or 12'. Each sprocket tooth 33 is separated from the next adjacent sprocket tooth 33 by a cavity 34 that is open only to one side of the sprocket 30. Referring now to FIG. 4 it is seen that the numbers 60 and 61 have between them a cavity 34 that is open only to the first side 31 of the sprocket whereas the numbers 62 and 63 have between them a cavity 34 that is open only to the second side 32 of the sprocket. The sprocket 30 includes a plurality of flange portions 35 located on alternating sides of the sprocket. Each flange portion 35 is of the same radial projection as that of the pair of adjacent teeth between which that flange portion extends. Each flange portion 35 projects generally radially outwardly perpendicularly to the axis of rotation 36 of the sprocket 30. Thus the combination of the alternating flange portions 35 and driving teeth 33 with the lugs of 24, 24' of the belt 11, 12, 11' or 12' positively transmit power to the belt and keep the belt from moving in a direction parallel to the sprocket axis 36 and out of engagement with the driving teeth 33. In a preferred embodiment the teeth 33 of the driving sprocket 30 are of a radial dimension D that is considerably greater than the amount H which a driving lug 24, 24' projects perpendicularly from the bottom surface 19, 19' of the belt 11, 12, 11' or 12'. This considerable clearance between the tips 28 of the driving lugs 24, 24' and the bottoms 37 of the cavities 34 is provided to inhibit disengagement of the belt 11, 12, 11' or 12' through entrainment and entrapment of the crop or debris such as mud, ice and rocks which may be encountered under certain harvesting conditions, for example, when the crop has fallen over and is not standing upright at the time of harvest. Because each cavity 34 is open to a side of the drive sprocket 30 any material which would otherwise be entrained in the bottom 37 of the cavity 34 is free to exit to the side. Preferably the bottom surface 37 of each sprocket cavity 34 slopes toward the axis of rotation 36 of the sprocket 33 in a direction away from the respective flange portion 35 to facilitate self-cleaning of the sprocket. It is preferable that the radially projecting flange portion 35 be connected to the cavity bottom surface 37 by an arcuate surface 38 to facilitate self cleaning. The fore and aft surfaces 39, 40 respectively of the cavity 34 should join to the bottom surface 37 of the cavity via arcuate surfaces or the bottom surface 37 of the cavity 34 should itself be an arcuate surface as shown. In te accompanying drawing the bottom surfaces 37 are shown to be conical. When these curved surfaces are combined as described and shown in FIGS. 4 and 5 the engagement of the driving lugs 24, 24' of the belt 11,12, 11' or 12' with its associated sprocket 30 serves to push downwardly and outwardly any debris that may otherwise become entrapped in the drive sprocket 30.

Figure 6:
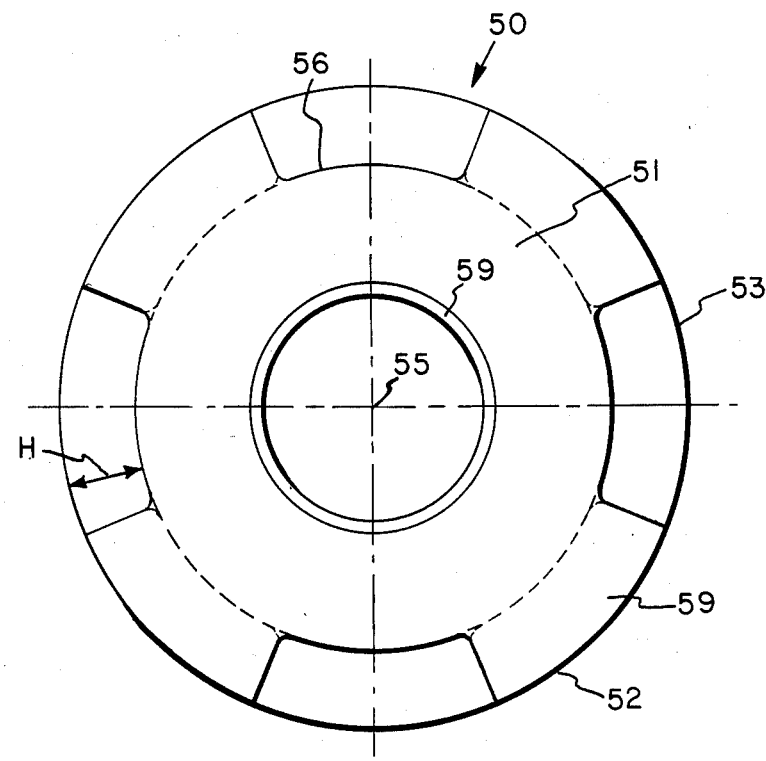
FIG. 6 is a side view of an idler sheave according to the invention.
Figure 7:
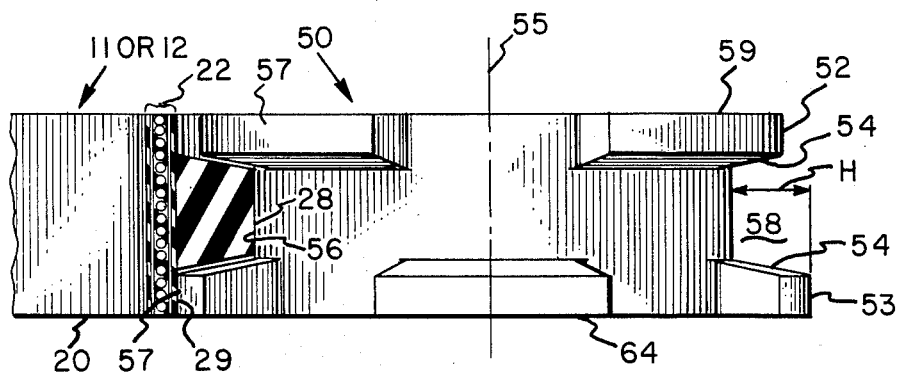
FIG. 7 is an end view of the sheave of FIG. 6 with the belt of the invention engaged therewith being shown in transverse section.

Referring now to FIGS. 6 and 7 as well as FIG. 1 there is shown a sheave 50 or idler pulley according to the invention. The sheave includes a cylindrical hub 51. A pair of axially spaced flanges 52, 53 project radially from the hub 51. The inner side surfaces 54 of the flanges 52, 53 converge in a direction toward the axis of rotation 55 of the sheave 50 forming a circumferentially extending groove 58 between them. Each of the flanges 52, 53 is interrupted in the circumferential direction of the sheave 50. The interruptions of one of the flanges 52 are not aligned with the interruptions of the other 53. As shown in FIG. 7 the height H of each drive lug 24' corresponds to the radial projection of the flanges 52 and 53. Thus in the belt and sheave combination as the belt 11, 12, 11' or 12' engages the sheave 30 the tips 28 of the drive lugs 24' contact the outer cylindrical surface 56 of the hub 51 and the edge portions 29 of the belt structure 22 contact the radially outermost surfaces 57 of the flanges 52, 53. The flanges 52, 53 of the sheave 50 are axially spaced apart so that the drive lugs 24 do not wedge between the flanges 52, 53 as in a conventional V-belt and pulley system. The flanges 52, 53 serve to guide the belt. The flanges 52, 53 are not intended to transmit power from the belt 11,12, 11' or 1' to the sheave 50. Because the flanges 52, 53 are interrupted in the circumferential direction of the sheave 50 foreign material that might otherwise become entrapped in the bottom of the circumferential groove 58 of the sheave 50 is able to exit to the sides 59, 64 of the sheave 50. In a preferred embodiment the circumferential distance between the interruptions of each flange 52, 53 of the sheave 50 is not an integral multiple of the driving lug pitch B so as to ensure that all portions of the sheave 50 eventually contact the longitudinally sides 25 of the driving lugs 24 and thereby even out wear of the belts 11 or 12 and associated sheave 50. The interruptions of one flange 52 are not aligned with the interruptions of the other flange 53 soas to assure guiding and control of the belt 11 or 12 at all times. The interruption of the flanges need not be of the same circumferential extent shown to be effective. The particular embodiment shown facilitates molding of the sheave.

The main reinforcing cords 23 of the belt 11 or 12 are of high tensile modulus material. Fiberglass or aramid are preferred for cords 23 although it is believed that nylon, polyester or the like may also be employed. High tensile loading of the belt 11, 12, 11' or 12' can occur at those times when an ear of corn or a stalk becomes lodged in the machine.

The driving lugs 24, 24' of the belt 11, 12, 11' or 12' of the preferred embodiment described and shown herein are of truncated pyramidal configuration and are not involute or conjugate. The sprocket 50 as shown is of a design that facilitates entry and exit of the driving lugs 24, 24' of the belt 11, 12, 11' or 12' by providing clearance for the corners 43 and tip 28 of each driving lug 24, 24'. Belts have been made utilizing elastomer material that is a blend of natural rubber and synthetic isoprene blended. However it is believed that other elastomeric or resilient materials for example, chloroprene or polyurethane of the like would serve equally well.

Referring to FIG. 1 it is seen that the leading edge 42 of each cleat 20 of the belt 11 or 12 is preferably tapered. The tapered leading edges 42 of each pair of opposed cleats thus tend to force the dislodged ears of corn toward the fore and aft directed centerline of the gathering head 10 and facilitate withdrawal of each cleat 20 from the ear(s) of corn that it is conveying as the cleat begins to rotate around its associated drive sprocket 30 at the aft end 17 of the gathering head 10. The triangular configuraitn of the leats 20' of belt 11 or 12' provide tapered leading edges to similarly facilitate withdrawal of each cleat 20' from the ears of corn.

The sprockets 30 and sheaves 50 are preferably made of ultra high molecular weight polyethylene. This material possesses sufficient strength and rigidity for this application. Use of this material is advantageous because it is not subject to rusting or corrosion and its low coefficient of friction aids in the desired self-cleaning action. Of course, plastics including reinforced plastics or metals may be used in construction of the sprockts and sheaves. When ultra high molecular weight polyethylene is used, each sprocket or sheave preferably includes a metal insert 39 or 59 concentrically positioned in its hub.

The cleats 20 are shown in FIG. 1 to be aligned with one another. This is not required. The cleats 20 may be staggered relative to one another.

It is to be understood that the relative positions of the driving sprockets and idler sheaves could be reversed such that the driving sprockets would be located at the forward end 16 of the machine that first engages the crop.

While certain representative embodiment and its detals have been described for the purpose of illustrating the invention it will be apparent to those skilled in the art that various changes and modifications may be made therein without departing from the spirit or scope of the invention.

I claim:

1. A reinforced elastomeric belt comprising:
   (a) a flexible reinforced structure having a top surface and a bottom surface, and a reinforcement embedded therein, the centerline of the reinforcement defining the pitch line of the belt;
   (b) a plurality of cleats of elastomeric material projecting generally perpendicularly from the top surface of the structure, each of said cleats when viewed in a longitudinal cross section of the belt being of triangular configuration having a bore extending therethrough with the base of the triangle joined to the top surface of the structure;
   (c) a plurality of driving lugs of elastomeric material projecting generally perpendicularly from the bottom surface of the structure, each of said driving lugs when viewed in longitudinal section of the belt being of trapezoidal configuration with the base of the trapezoid joined to the bottom surface of the structure, each of said lugs when viewed in a transverse section of the belt being of trapezoidal configuration with the base of the trapezoid joined to the bottom surface of the structure, with the sides of each lug converging in a direction away from the bottom surface of the structure, wherein the base of each cleat extends from a point opposite one lug to a point opposite the next adjacent lug.

2. In a belt and sprocket and sheave combination,
   (a) a reinforced elastomeric belt formed in a flexible reinforced structure having a top surface and a bottom surface, and a reinforcement embedded therein, the cetnerline of the reinforcement defining the pitch line of the belt, a plurality of cleats of elastomeric material projecting generally perpendicularly from the top surface of the structure, each of said cleats when viewed in a longitudinal cross section of the belt being of traingular configuration having abore extending therethrough with the base of the triangle joined to the top surface of the structure, a plurality of driving lugs of elastomeric material projecting generally perpendicularly from the bottom surface of the structure, each of said driving lugs when viewed in longitudinal section of the belt being of trapezoidal configuration with the base of the trapezoid joined to the bottom surface of the structure, each of said lugs when viewed in a transverse section of the belt being of trapezoidal configuration with the base of the trapezoid joined to the bottom surface of the structure with the sides of each lug converging in a direction away from the bottom surface of the structure;
   (b) a driving sprocket having first and second sides comprising a plurality of equally spaced apart, radially projecting teeth separated by a like number of first and second cavities, said first cavities being open to only the first side of the sprocket and said second cavities being open only to the second side of the sprocket;
   (c) a sheave comprising a cylindrical hub including a pari of axially spaced flange projecting radially therefrom whose inner surfaces converge in a direction toward the axis of rotation of the sheave, each flange being interrupted in the circumferential direction of the sheave, the interruptions of one of said flanges not being aligned with the interruptions of the other, wherein the distance that each drive lug projects away from the bottom surface of the belt is substantially equal to the distance that each flange of the sheave projects radially outwardly from the cylindrical hub of the sheave such that that portion of the belt engaged with the sheave is supported by contact of the tip of each drive lug with the cylindrical hub of the sheave while the flanges of the sheave contact the bottom surface of the flexible reinforced structure on both sides of the driving lugs.

3. In a belt and sprocket and sheave combination,
   (a) a reinforced elastomeric belt formed of a flexible reinforced structure having a top surface and a bottom surface, and a reinforcement embedded therein, the centerline of the reinforcement defining the pitch line of the belt, a plurality of cleats of elastomeric material projecting generally perpendicularly from the top surface of the structure, each of said cleats when viewed in a longitudinal cross section of the belt being of triangular configuraiton having a bore extending therethrough with the base of the triangle joined to the top surface of the structure, a plurality of driving lugs of elastomeric material projecting generally perpendicularly from the bottom surface of the structure, each of said driving lugs when viewed in longitudinal section of the belt being of trapezoidal configuration with the base of the trapezoid joined to the bottom surface of the structure, each of said lugs when viewed in a transverse section of the belt being of trapezoidal configuration with the base of the trapezoid joined to the bottom surface of the structure with the sides of each lug converging in a direction away from the bottom surface of the structure;

(b) a driving sprocket having first and second sides comprising a plurality of equally spaced apart, radially projecting teeth separated by a like number of first and second cavities, said first cavities being open to only the first side of the sprocket and said second cavities being open only to the second side of the sprocket;

(c) a sheave comprising a cylindrical hub including a pair of axially spaced flanges projecting radially therefrom whose inner surfaces converge in a direction toward the axis of rotation of the sheave, each flange being interrupted in the circumferential direction of the sheave, the interruptions of one of said flanges not being aligned with the interruptions of the other, wherein the depth D of the grooves in the drive sprocket exceeds the height H of the drive lugs.

4. The combination of claim 3 wherein the depth D of the grooves in the sprocket exceeds the height H of the drive lugs by at least one-tenth inch.

5. A crop gathering head including a pair of belts driven synchronously, running parallel to each other in a common plane, the direction of travel of one belt being opposite that of the other, each belt having a top surface, the top surfaces of the belts being adjacent and opposed to one another, the adjacent top surfaces moving in the same direction at the same surface speed, the top surface of each belt including a plurality of identical cleats of elastomeric material projecting substantially perpendicularly therefrom, each of the cleats when viewed in a longitudinal section of the belt being of triangular configuration with the base of the triangle being joined to the top surface of the belt, wherein each of the cleats when viewed in longitudinal section of the belt is of hollow triangular configuration, the bottom surface of each belt includes a plurality of integrally molded driving lugs projecting substantially perpendicularly therefrom, each of the cleats is of a transverse dimension less than that of the belts, each individual cleat begins at a point opposite one driving lug and extends in the longitudinal direction of the belt to a point opposite the next adjacent driving lug, the apex of each cleat being positioned longitudinally between a pair of driving lugs.

* * * * *